FIP8106 XR 3,739,173

X 5006 Y

X370-112

X370-19

(6)

United States [redacted]

Broussaud

[11] 3,739,173

[45] June 12, 1973

[54] INTERLACED MULTIPLEXING ELECTRO-OPTICAL SYSTEM

[75] Inventor: Georges Broussaud, Paris 16eme, France

[73] Assignee: Thomson-CSF, Paris, France

[22] Filed: Feb. 5, 1971

[21] Appl. No.: 112,893

[30] Foreign Application Priority Data

Feb. 18, 1970 France .............................. 7005787

[52] U.S. Cl. .............................. 250/199, 350/162

[51] Int. Cl. .............................. H04b 9/00

[58] Field of Search .............. 250/199; 179/15 FD; 350/162 R, 162 SF, 169

[56] References Cited

UNITED STATES PATENTS

| | | | |
|---|---|---|---|
| 3,586,416 | 6/1971 | De Bitetto | 350/169 |
| 3,574,616 | 4/1971 | Mueller | 350/162 |
| 3,408,143 | 10/1968 | Mueller | 350/162 |

*Primary Examiner*—Albert J. Mayer
*Attorney*—Cushman, Darby & Cushman

[57] ABSTRACT

A double diffraction optical system associated with a monochromatic light source, with optical-electrical modulating means and with photoelectric detector means, for effecting the interlaced spectral demultiplexing of a plurality of multiplexed electrical signals.

7 Claims, 6 Drawing Figures

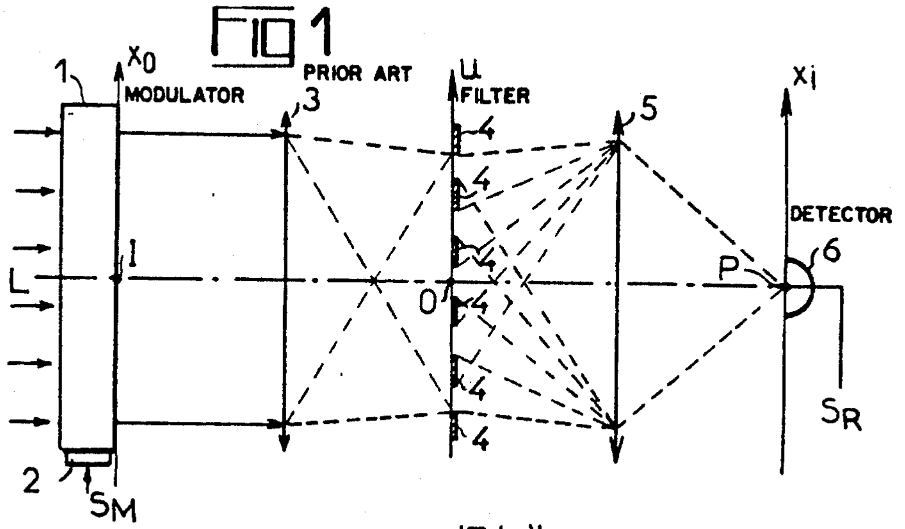
Fig 1
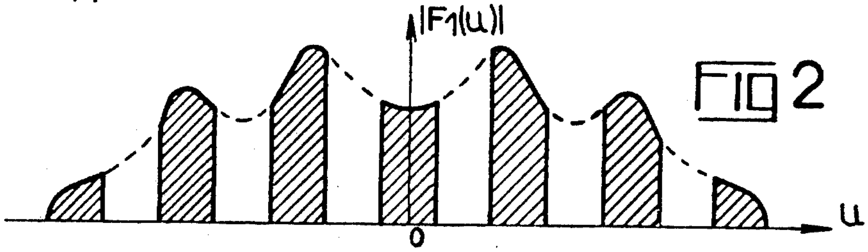
Fig 2
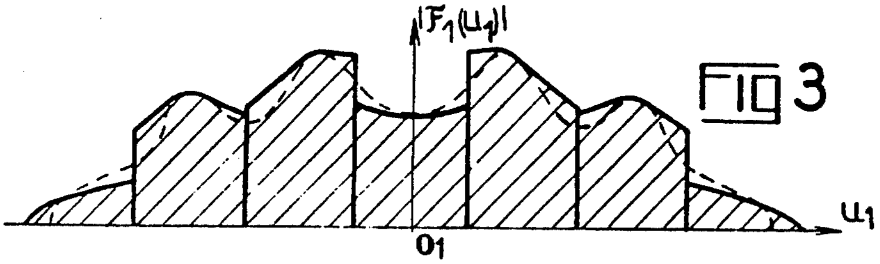
Fig 3
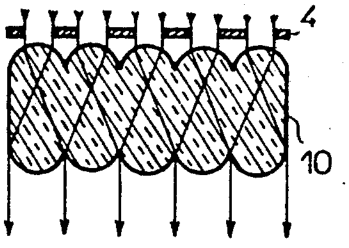
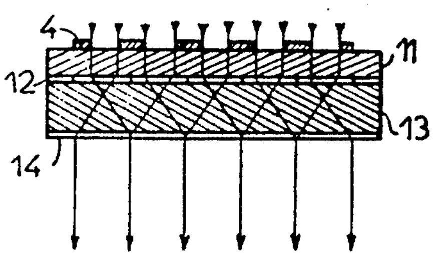
Fig 5 Fig 6

INTERLACED MULTIPLEXING ELECTRO-OPTICAL SYSTEM

The present invention relates to electro-optical systems for interlaced spectral multiplexing of electrical signals, and more particularly to demultiplexing devices comprising a double diffraction optical apparatus equipped with a parallel-slot filter such systems are disclosed in a copending application Ser. No. 882,880, filed Dec. 8, 1969, now U.S. Pat. No. 3,703,640 and relating to "SIGNAL SPECTRAL MULTIPLEXING SYSTEM." The use of a grating comprising a set of slots for selectively transmitting that portion of the interlaced spectrum which corresponds to one of the multiplexed electrical signals, gives rise to a zero order principal image of the selected signal, to which there are added high order secondary images which may overlap the principal one. In order to help overcome this drawback, it is possible to use a filter whose slots have a non uniform spacing although this solution does not make it possible to completely eliminate secondary images.

According to the present invention, there is provided a spectral demultiplexing system for demultiplexing a multiplexed electrical signal whose frequency spectrum comprises interlaced spectral bands respectively belonging to the frequency spectra of N electrical signals, N being an integer at least equal to 2, said system comprising : a monochromatic radiant energy source emitting a beam ; an electro-optical modulator position for modulating said beam said modulator having a control input for receiving said multiplexed signal ; a first diffracting system having an input positioned for receiving the radiant energy emerging from said modulator ; an optical filter positioned for receiving the diffracted energy emerging from said first diffracting system ; said optical filter comprising a plurality of parallel slots transmitting selected portions of the diffracted energy emerging from said first diffracting system, and optical spreader means facing said slots in order to project onto a plane parallel to said slots, enlarged images thereof ; a second diffracting system positioned for receiving the radiation emerging from said plane ; and photoelectric means positioned for receiving the radiant energy emerging from said second diffracting system.

For a better understanding of the invention and to show how the same may be carried into effect reference will be made to the drawing accompanying the ensuing description, and in which :

FIG. 1 is a schematic representation of a multiplexing apparatus of known design;

FIGS. 2 and 3 represent light amplitude distributions corresponding to the frequency spectrum of a signal ;

FIGS. 5 and 6 are variant embodiments of the optical filter employed in the optical device of FIG. 4.

Figure 4:
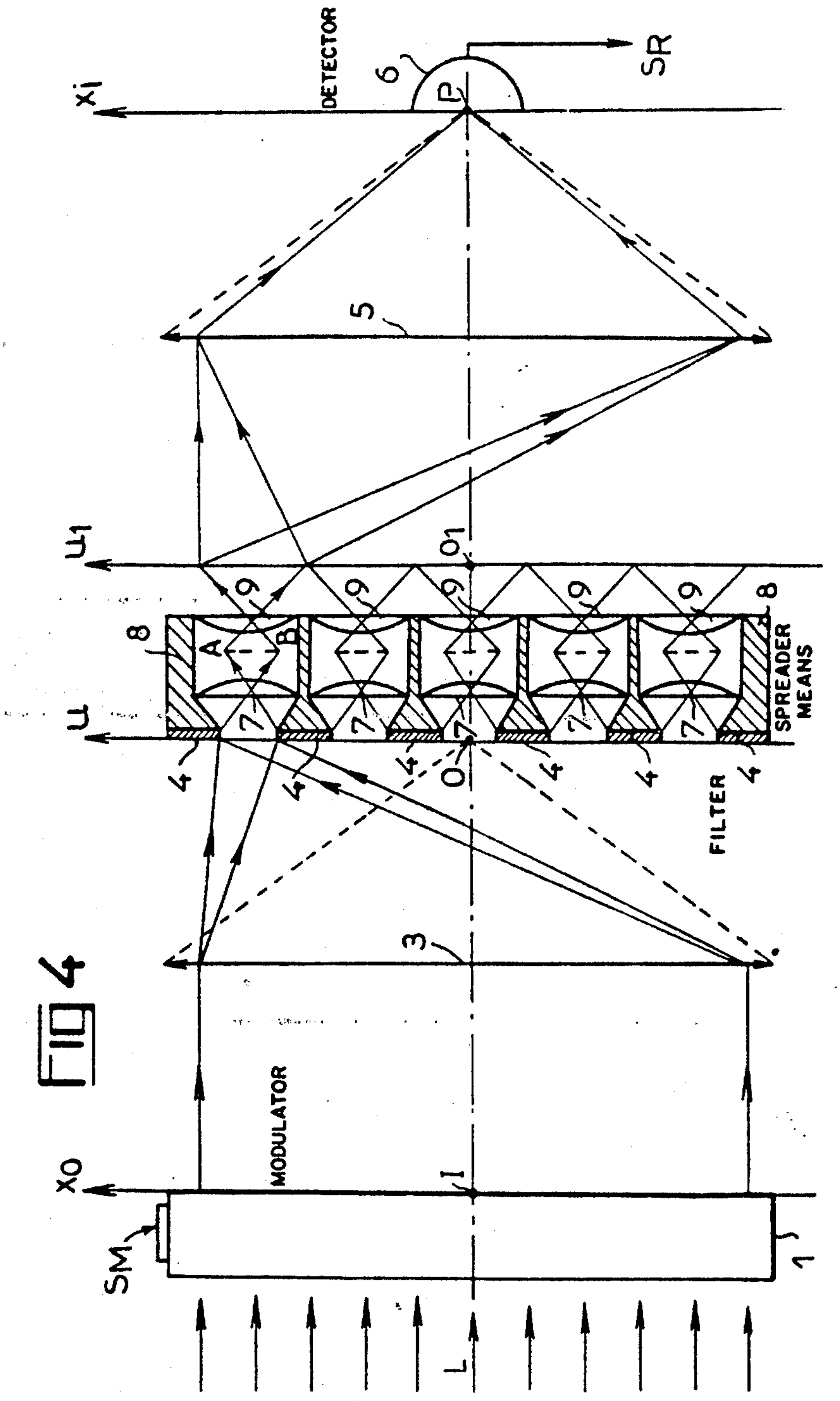
FIG. 4 shows a spectral demultiplexing device in accordance with the present invention.

In FIG. 1, there can be seen shematically a spectral demultiplexing electro-optical device of known structure.

The device in FIG. 1 comprises two lenses 3 and 5 centered in relation to an optical axis I.P., an electro-optical modulator 1, 2 receiving a coherent beam L or radiant energy a modulating signal $S_M$, an optical filter 4 equipped with parallel slots and a photo-electric transducer 6 producing a demultiplexed signal $S_R$.

The signal $S_M$ applied to the electro-optical modulator excites through the medium of an electro-mechanical transducer 2 a vibrator wave travelling within plate 1.

This wave gives rise to a mechanical stressing of plate 1. A phase-contrast optical device associated with the plate 1 transforms the variations of the index of refraction resulting from the mechanical stresses, into corresponding variations in the intensity of the radiant energy emerging from the exit face $IX_O$ of the electro-optical modulator. The lens 3, whose focus O is located in the filter plane U, diffracts the modulated beam emerging from modulator 1, 2 and projects on to said plane U the frequency spectrum of a section of the modulating signal $S_M$. The projected spectrum is an interlaced one, comprising juxtaposed spectral bands belonging to the frequency spectra of several distinct signals $f_1(t), f_2(t), \ldots$ In FIG. 2, cross-hatched spectral bands have been used to indicate the parts of the spectrum $F_1$ of the signal $f_1(t)$ ; the gaps in FIG. 2, correspond to the bars of the filter 4; the dotted line connecting the spectral sections, represents the envelope of the spectrum of the signals $f_1(t)$. The reconstruction of the signal $f_1(t)$ is based on a suitable processing of the incomplete spectrum of FIG. 2.

However, the periodic structure of this spectrum gives rise to the formation of a zero order principal image of the signal $f_1(t)$ plus undesired secondary images.

In order to overcome this drawback, the present invention provides an optical device wherein the gaps illustrated in FIG. 2 can be filled out by spreading the spectral sections transmitted by the filter 4.

FIG. 3 shows the spectrum of FIG. 2 as modified by spreading out its spectral sections. The spectrum of FIG. 3 has an envelope similar to the dotted envelope of the complete spectrum of signal $f_1(t)$ ; in addition, this spread spectrum has a continuous structure which, through the medium of a Fourier transform, is capable of producing a signal image of $F_1(t)$.

FIG. 4 shows schematically an electro-optical demultiplexing device in accordance with the present invention. It comprises an electro-optical modulator 1 receiving a beam L of radiant energy for example, a beam of coherent light which is modulated by an electrical signal $S_M$. A lens 3, whose foci are at I and O, forms in the plane U passing through O, a luminous amplitudes distribution corresponding to the frequency spectrum of the signal $S_M$. Those portions of said spectrum which are transmitted by the slots of the optical filter 4, are received by sets of lenses 7 and 9 fixed to a mount 8 integral with the rear face of the filter 4. Each lens 7 forms an intermediate image A of the corresponding slot of the filter 4 and this image is in turn projected by the lens 9 in enlarged and erected form, on to the plane $U_1$ which is parallel to the plane U.

The combination of the lenses 7 and 9 is selected so that the enlarged images of the slots of the filter 4 are disposed side-by-side in the plane $U_1$. Thus, in said plane $U_1$ a frequency spectrum similar to that of FIG. 3 is obtained. The lens 5 whose foci are located at the points $O_1$ and P, collects the light coming from the plane $U_1$ and projects onto the plane $X_t$ a light distribution having the characteristics of one of the elementary signals contained in the multiplexed signal $S_M$. A photoelectric detector 6 associated to a selection diaphragm having a slot located at P, serves to transform the received light into a demultiplexed electrical signal $S_R$.

In FIG. 4, the slots of the filter 4 are oriented in the direction perpendicular to the plane of the figure and the same applies to the lenses 7 and 9 which are in fact cylindrical lenses, only the transverse section of which has been illustrated. The multiplexing restores the electrical signal $S_R$ to its initial form the more accurately the larger the number of slots in the filter and the number of lens systems 7 and 9.

In practice, the optical-filter 4 is manufactured with a much larger number of slots than FIG. 4 shows ; also, it is a better approach to design the lenses 7 and 9 in the manner shown in FIGS. 5 and 6.

In FIG. 5, a transverse section of the optical filter 4 and of an optical spreader device 10 constituted by a refractive material whose top and bottom faces are fluted, can be seen. The fluted faces form a succession of cylindrical optical systems similar to the lenses 7 and 9 of FIG. 4. In FIG. 5, it can be seen how the parallel beams coming from the slots of the filter 4 are united to form a single parallel beam which is picked up by the lens 5 in the same way as in the case depicted in FIG. 4.

Without departing from the scope of the present invention, it is likewise possible to achieve the spreading of the beams transmitted by the optical filter 4, using holographic lenses. In FIG. 6, two transparent plates 11, 13 superimposed upon one another, can be seen ; the plate 11 carries on its top face an optical filter 4 with slots ; the bottom face of the place 11 is equipped with holographic lenses 12 whilst the bottom face of the plate 13 likewise carries holographic lenses 14 ; the lenses 12 and 14 co-operate to form beneath each slot of the filter 4, afocal optical systems capable of spreading the light beams transmitted by the filter 4 in order to produce a plain beam.

The holographic lenses 12 and 14 can be constructed in accordance with known techniques. These holographic lenses are obtained for example, by recording upon a photographic plate the pattern of interference fringes produced by two cones of coherent monochromatic light emerging from point sources located at either side of the plate. It is not necessary for the lenses of the spreader system to be cylindrical. The utilization of holographic lenses enables simple and accurate positioning of the optical spreader system in relation to the optical filter to be achieved.

What I claim :

1. A spectral demultiplexing electro-optical system for demultiplexing a multiplexed electrical signal whose frequency spectrum comprises interlaced spectral bands respectively belonging to the frequency spectra of N electrical signals, N being an integer at least equal to two, said system comprising : a monochromatic radiant energy source emitting a beam ; an electro-optical modulator positioned for modulating said beam, said modulator having a control input for receiving said multiplexed signal ; a first diffracting system having an input positioned for receiving the radiant energy emerging from said modulator ; an optical filter positioned for receiving the diffracted energy emerging from said first diffracting system ; said optical filter comprising a plurality of parallel slots transmitting selected portions of the diffracted energy emerging from said first diffracting system, and optical spreader means facing said slots in order to project onto a plane parallel to said slots, enlarged images thereof ; a second diffracting system positioned for receiving the radiation emerging from said plane ; and photo-electric means positioned for receiving the radiant energy emerging from said second diffracting system.

2. A spectral demultiplexing device as claimed in claim 1, wherein said enlarged images are arranged side-by-side.

3. A spectral demultiplexing device as claimed in claim 1, wherein said optical spreader means comprise, facing each of said slots, a pair of lenses capable of projecting an enlarged erect image of the slot.

4. A spectral demultiplexing device as claimed in claim 3, wherein said lenses comprise a plate of refractive material having at least one fluted face ; said plate being integral with said filter.

5. A spectral demultiplexing device as claimed in claim 3, wherein said lenses are holographic lenses integral with said filter.

6. A spectral demultiplexing device as claimed in claim 3, wherein said lenses are cylindrical lenses ; the curved faces of said lenses having generatrices parallel to said slots.

7. A spectral demultiplexing device as claimed in claim 1, wherein said radiant energy source is a source of coherent luminous energy.

* * * * *